(12) United States Patent
Turi

(10) Patent No.: US 7,478,584 B2
(45) Date of Patent: Jan. 20, 2009

(54) COFFEE MAKER HAVING A HEIGHT ADJUSTABLE COLLECTING TRAY

(75) Inventor: Mariano Turi, Zurich (CH)

(73) Assignee: Saeco IPR Limited, Dublin (IE)

( * ) Notice: Subject to any disclaimer, the term of this patent is extended or adjusted under 35 U.S.C. 154(b) by 600 days.

(21) Appl. No.: 11/173,059

(22) Filed: Jul. 1, 2005

(65) Prior Publication Data

US 2006/0065126 A1    Mar. 30, 2006

(30) Foreign Application Priority Data

Sep. 24, 2004 (SE) .................................. 1565/04

(51) Int. Cl.
*A47J 31/00* (2006.01)
(52) U.S. Cl. .............................. 99/284; 99/279; 99/306
(58) Field of Classification Search ............. 99/284, 99/304, 307, 275, 279, 306; 211/162, 207, 211/208; 248/125.1, 125.2, 125.3, 125.8
See application file for complete search history.

(56) References Cited

U.S. PATENT DOCUMENTS

| | | | | |
|---|---|---|---|---|
| 4,294,166 A | * | 10/1981 | Takeuchi | 99/348 |
| 5,363,746 A | * | 11/1994 | Gordon | 99/328 |
| 6,392,877 B1 | * | 5/2002 | Iredale | 361/683 |
| 6,766,729 B2 | * | 7/2004 | Rolland | 99/284 |

FOREIGN PATENT DOCUMENTS

| | | | |
|---|---|---|---|
| CH | 315837 | | 10/1956 |
| DE | 32 41 606 | | 3/1984 |
| DE | 4226151 | * | 2/1994 |
| DE | 102 39 594 | | 3/2004 |

* cited by examiner

*Primary Examiner*—Reginald L Alexander
(74) *Attorney, Agent, or Firm*—Maginot, Moore & Beck LLP

(57) ABSTRACT

The coffee maker comprises a height adjustment assembly by means of which the height position of a collecting tray, adapted to receive one or two coffee cups to be filled with coffee beverage, is adjustable. The collecting tray is attached to a support member. The height adjustment assembly comprises at least one vertically extending gear rack that can be non-positively engaged by a slider provided at the support member. The slider is biased by a spring towards the gear rack and can be manually displaced against the force of the spring.

43 Claims, 8 Drawing Sheets

COFFEE MAKER HAVING A HEIGHT ADJUSTABLE COLLECTING TRAY

BACKGROUND OF THE INVENTION

The present invention refers to a coffee maker comprising a housing, a beverage outlet, a collecting tray located below the beverage outlet, and a height adjustment assembly for adjusting the height position of the collecting tray.

In coffee makers, particularly in espresso coffee machines, it is desirable to design the collecting tray receiving the coffee cups to be filled such that its height position can be adjusted to the height of the coffee cups to enable cups with different heights to be positioned below the beverage outlet in an optimal distance.

PRIOR ART

The document EP-B-1,278,444 A1 discloses a machine for brewing beverages. It comprises a pedestal provided with a collecting tray. The collecting tray is provided with a cover, constituting a support for the beverage container. Moreover, the machine comprises a pillar rigidly connected to the pedestal, the head of the pillar being provided with a beverage outlet. The cover of the collecting tray is provided with an apron, the inner wall thereof comprising three slide rails located vertically one above the other one. The tray is provided at both sides with a rib adapted to engage one of the slide rails. The height position of the cover of this machine can be adjusted in three steps.

The document EP-A-0,585,607 discloses an espresso coffee machine having a height adjustable support plate. The support plate is attached to the base of the machine via a collecting tray. The height adjustment is based on the principle of a screw drive, effective either between the base of the machine and the collecting tray or between the collecting tray and the support plate. By rotating the collecting tray, the height position of the support plate is adjusted.

The document DE-A-32,41,606 discloses an electrical coffee maker, having an extension arm or beam located below the coffee beverage outlet and on which is arranged a collecting tray. The collecting tray is covered by a cover plate provided with passages and serves as a support for two coffee mugs.

A disadvantage of all of these afore mentioned coffee machines can be seen in the fact that the collecting tray and the support plate, respectively, cannot be adjusted in height or only within a limited range.

The document CH 315,837 finally discloses an electrical espresso coffee machine, provided with a steam boiler which is enclosed by a stand. For receiving cups or tumblers, a height adjustable plate member is provided which is vertically arranged below the brewing container. The plate member comprises a glider, guided in a vertical slot of the stand. Sideways of this slot, detents are provided that can be engaged by a locking member provided with cam members. The locking member is connected to a spring biased pusher by means of a rod located at the bottom of the plate member. By operating the pusher, the locking member is disengaged with the result that the plate member can be adjusted regarding its height position. In this design, the danger exists that the height adjustable plate member is unstable and waggy because it is guided only centrally. Moreover, it is probably relatively sensitive to eccentric loads.

OBJECTS OF THE INVENTION

It is an object of the invention to provide a coffee maker having a coffee cup rest member whose height position can be adjusted quickly and easily within a broad range.

It is a further object of the invention to provide a coffee maker having a coffee cup rest member in which a canting of the rest member is substantially avoided during the operation of adjusting its height position.

It is a further object of the invention to provide a coffee maker having a coffee cup rest member in which the rest member is steadily fixed is the selected height position.

SUMMARY OF THE INVENTION

To meet this and other objects, the present invention provides a coffee maker, comprising a housing, a beverage outlet, a collecting tray located below the beverage outlet, and a height adjustment assembly for adjusting the height position of the collecting tray. The collecting tray is attached to a support member of the height adjusting assembly and provided with a cover plate member adapted to receive at least one coffee cup.

According to a first aspect of the invention, the height adjusting assembly comprises a vertically extending gear rack member and two guide rail members running along both sides of the gear rack member and adapted to guide the support member. The support member of the height adjustment assembly comprises at least one element adapted to engage the gear rack member and to releasably lock the support member vertically along the gear rack member.

According to a second aspect of the invention, the height adjusting assembly comprises two gear rack members and a guide rail member located between the two gear rack members. The support member is provided with a guide member engaging the guide rail and a shaft member having at each of its two ends a pinion each engaging one of the two gear rack members.

By providing the height adjustment assembly either with a vertically extending gear rack and two guide rail members running along both sides of the gear rack member and adapted to guide the support member, or with two gear rack members and a guide rail member located between the two gear rack members, the fundamental prerequisite is created to adjust the height position of the coffee cup rest member within a broad range in such a manner that it is soundly fixed in the selected position and reliably guided so that it cannot cant during the adjustment of the height position.

BRIEF DESCRIPTION OF THE DRAWINGS

In the following, an embodiment of the coffee maker according to the invention will be further described, with reference to the accompanying drawings, in which.

DETAILED DESCRIPTION OF A PREFERRED EMBODIMENT

Figure 1:
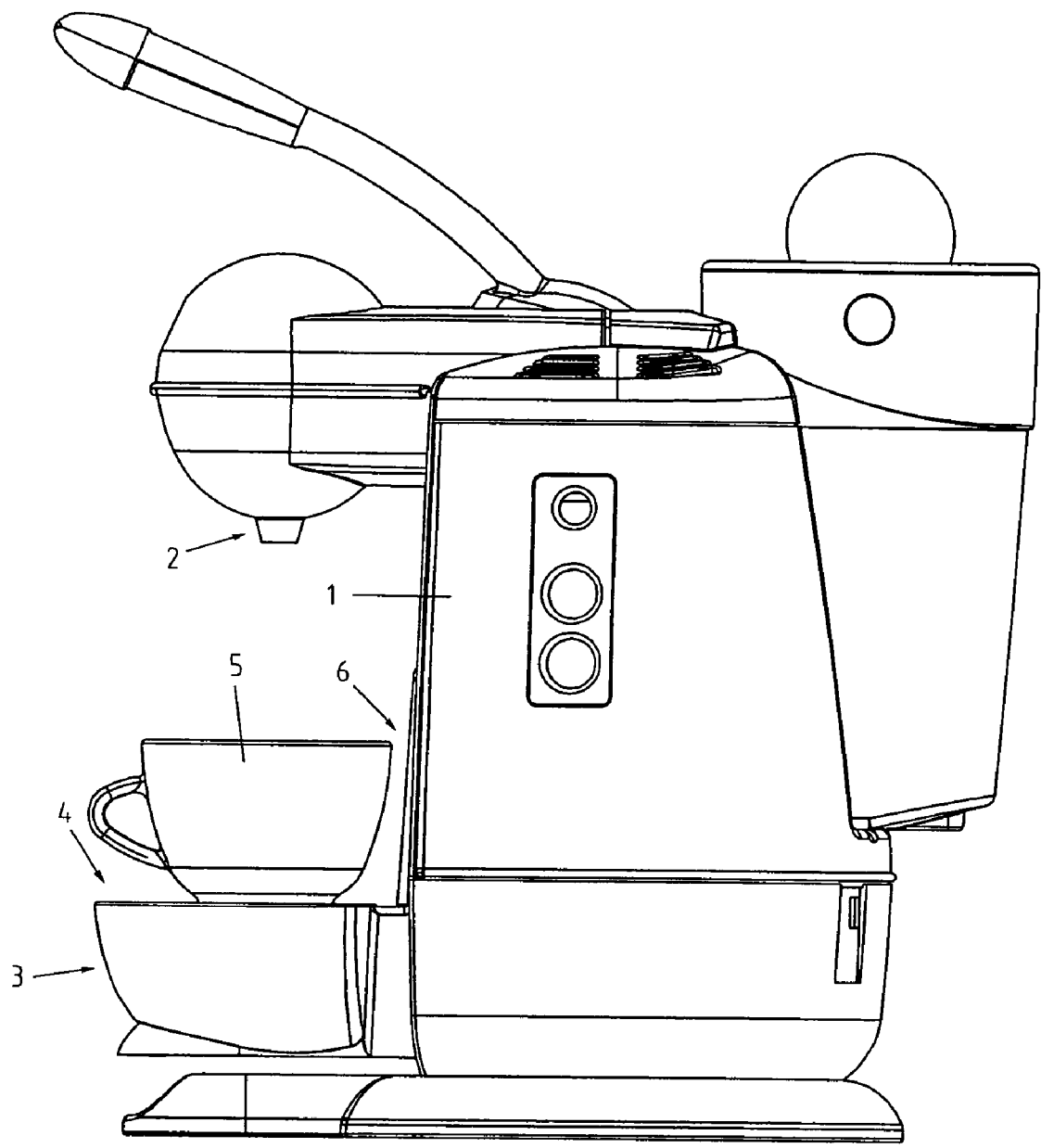
FIG. 1 shows a side view of a coffee maker.

FIG. 1 shows a semi-automatic coffee machine in a side view. Since such coffee makers are well known to any person skilled in the art, only those characteristics will be further discussed herein after which are relevant to the present invention.

The housing of the coffee maker is generally designated by reference numeral 1. The coffee maker is provided with a beverage outlet 2, located above a collecting tray 3. The collecting tray 3 serves for collecting fluid, particularly residual water or coffee beverage, for example dripping out of the beverage outlet 2 once a coffee beverage has been prepared. The top side of the collecting tray 3 is provided with a grating 4 on which one or two coffee mugs can be placed. The collecting tray 3 is height adjustably attached to the housing 1 of the coffee maker by means of an adjustment assembly 6.

Figure 2:
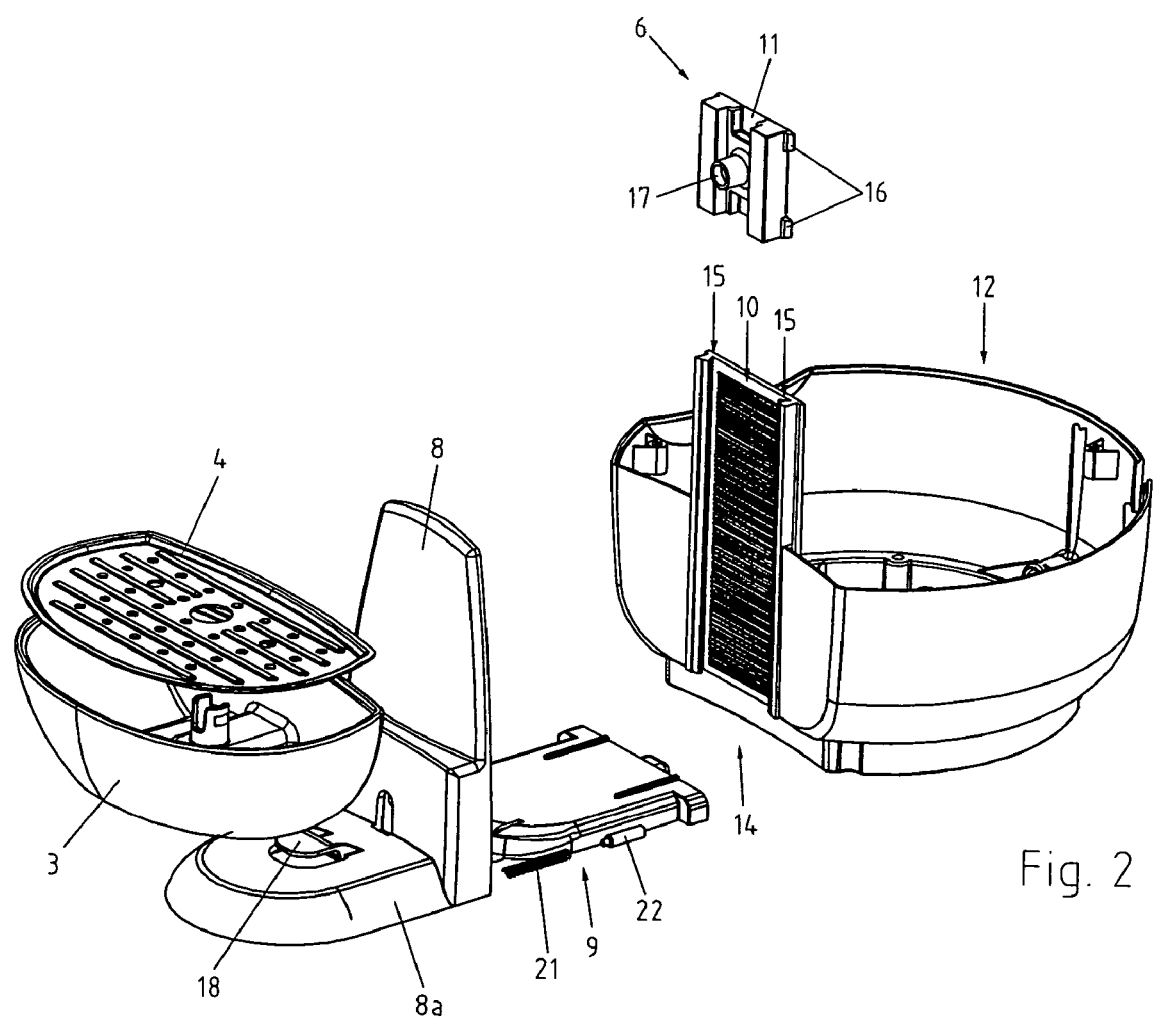
FIG. 2 shows some components of the coffee maker in an exploded perspective view.

In FIG. 2, a number of components and elements of the coffee maker and particularly of the height adjustment assembly 6 are shown in an exploded view from an elevated point of view. Particularly, the collecting tray 3, the grating 4, a L-shaped support member 8, a slider member 9, a gear rack 10 provided on a lower portion 12 of the housing of the coffee maker, as well as a carriage 11 are shown in this figure. A central portion 14 of the gear rack 10 is provided with a plurality of tooth-like embossments, while the two lateral sides of the gear rack 10 are provided each with a guide rail 15 delimiting a dovetail-shaped groove. The carriage 11 is provided with guide cams 16 corresponding in size and shape to the dovetail-shaped grooves. Further, the carriage 11 comprises a cylindrical stub 17 to which is attached the support member 8 by means of a not further shown screw means. Thus, the real adjustment assembly is essentially constituted by the gear rack 10, together with the two guide rails 15 and the carriage 11. The slider 9 serves for locking the support member 8 on the gear rack 10 in vertical direction, as will be further explained herein after.

The slider 9 is further provided with two pressure springs 21. In FIG. 2, only one of those springs 21 is visible; it is understood that the other one is located symmetrically at the opposite side of the slider 9. The springs 21 rest on hinge-like retainers 22; again, only one of those retainers 22 is visible; it is understood that the other one is located symmetrically at the opposite side of the slider 9. The two springs 21 bias the slider 9 in a direction towards the gear rack 10. The base portion of the support member 8 constitutes a support member foot 8a, whereby the top side thereof is provided with a snap-on element 18, serving for fixing the collecting tray 3.

The height adjustment assembly as shown in the drawings and discussed herein before, comprising a central gear rack 10 and two guide rails 15 located at both sides thereof, ensures that the height position of the support member 8 can be quickly and easily adjusted without the danger that the support member 8 and the carriage 11, respectively, would cant. By providing two guide rails 15, it is ensured that the support member 8 is soundly supported by the coffee machine and not very sensitive to eccentric loading.

Figure 3:
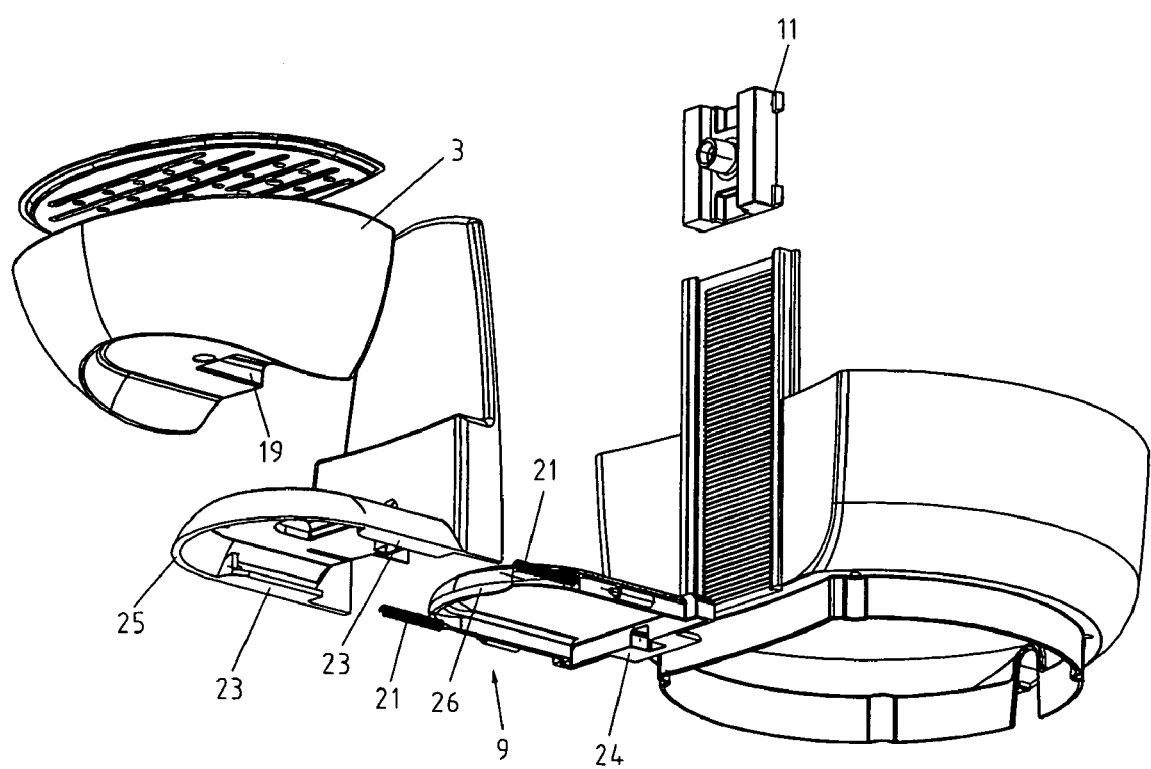
FIG. 3 shows the components shown in FIG. 2 in another exploded, perspective view.

In FIG. 3, the components and elements of FIG. 2 are shown in an exploded view as seen from a lower point of view. In this view, particularly a recess 19 located at the bottom of the collecting tray 3, two slide bars 23 located at the bottom of the support member 8, a protrusion 24 located at the slider 9 as well as the two pressure springs 21 are apparent. Moreover, in this view, it can be seen that both the support member foot 8a and the slider 9 are provided each with an apron 25, 26, located at the front side of these elements 8a, 9 and serving as a handle.

While the slide bars 23 serve for guiding and supporting the slider 9, the latter one is biased towards the gear rack 10 by means of the two springs 21. The protrusion 24 provided on the slider 9 has a front portion corresponding in shape and size to the tooth-like embossments of the gear rack 10 and serves for locking the carriage 11, and therewith the support member 8 as well as the collecting tray 3, to prevent any vertical movement. The apron 26 serves for manually grasping the slider 9, such that an operator can move the slider 9 forward, against the force of the two springs 21, to disengage the protrusion 24 from the gear rack 10. By means of the recess 19 located at the bottom of the collecting tray 3, the latter one can be attached, in the sense of a push-fit, to the snap-on element 18 located at the top of the support member foot 8a (FIG. 2).

Figure 4:
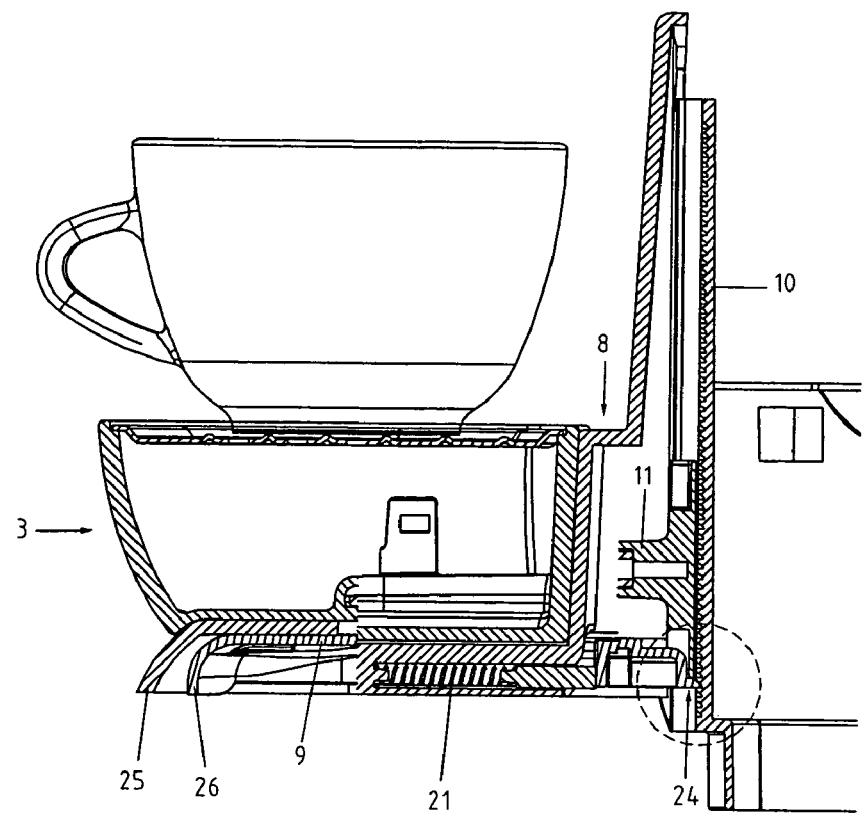
FIG. 4 shows a longitudinal sectional view of certain components of the coffee maker.

FIG. 4 shows the components and elements of FIGS. 2 and 3 in a longitudinal sectional view. In order to be able to adjust the height position of the collecting tray 3, the slider 9 is manually pulled forward, against the force of the springs 21, by grasping it on the apron 26. Thereby, the protrusion 24 is disengaged from the particular recess in the gear rack 10, with the result that the carriage 11, together with the collecting tray 3 attached thereto, can be moved upwards or downwards.

Figure 4A:
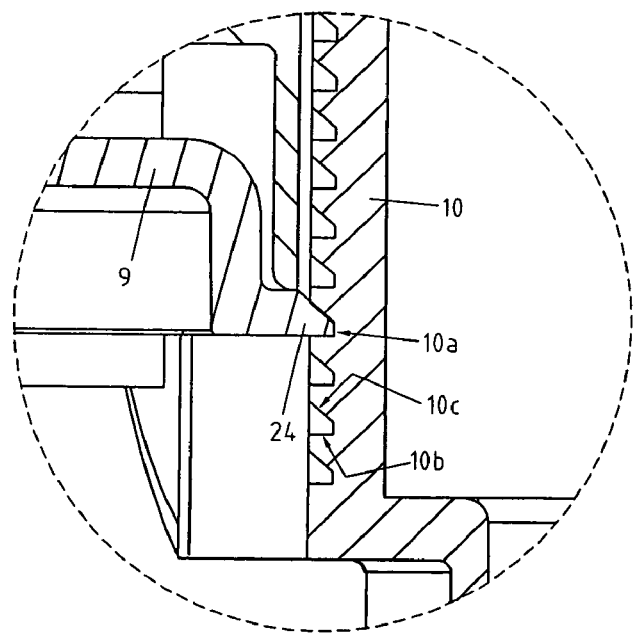
FIG. 4*a* shows an enlarged view of a portion of FIG. 4.

FIG. 4a shows an enlarged view of a portion of FIG. 4. Particularly apparent in this view is the way how the protrusion 24 of the slider, which is biased by the springs 21, non-positively engages a recess 10a of the gear rack 10. In order to prevent the protrusion 24 to slide out of engagement if the collecting tray 3 is loaded, e.g. by two full coffee mugs, the bottom region 10b of the particular recess 10a extends essentially horizontally, while the top region 10c of the particular recess 10a is inclined.

Figure 5:
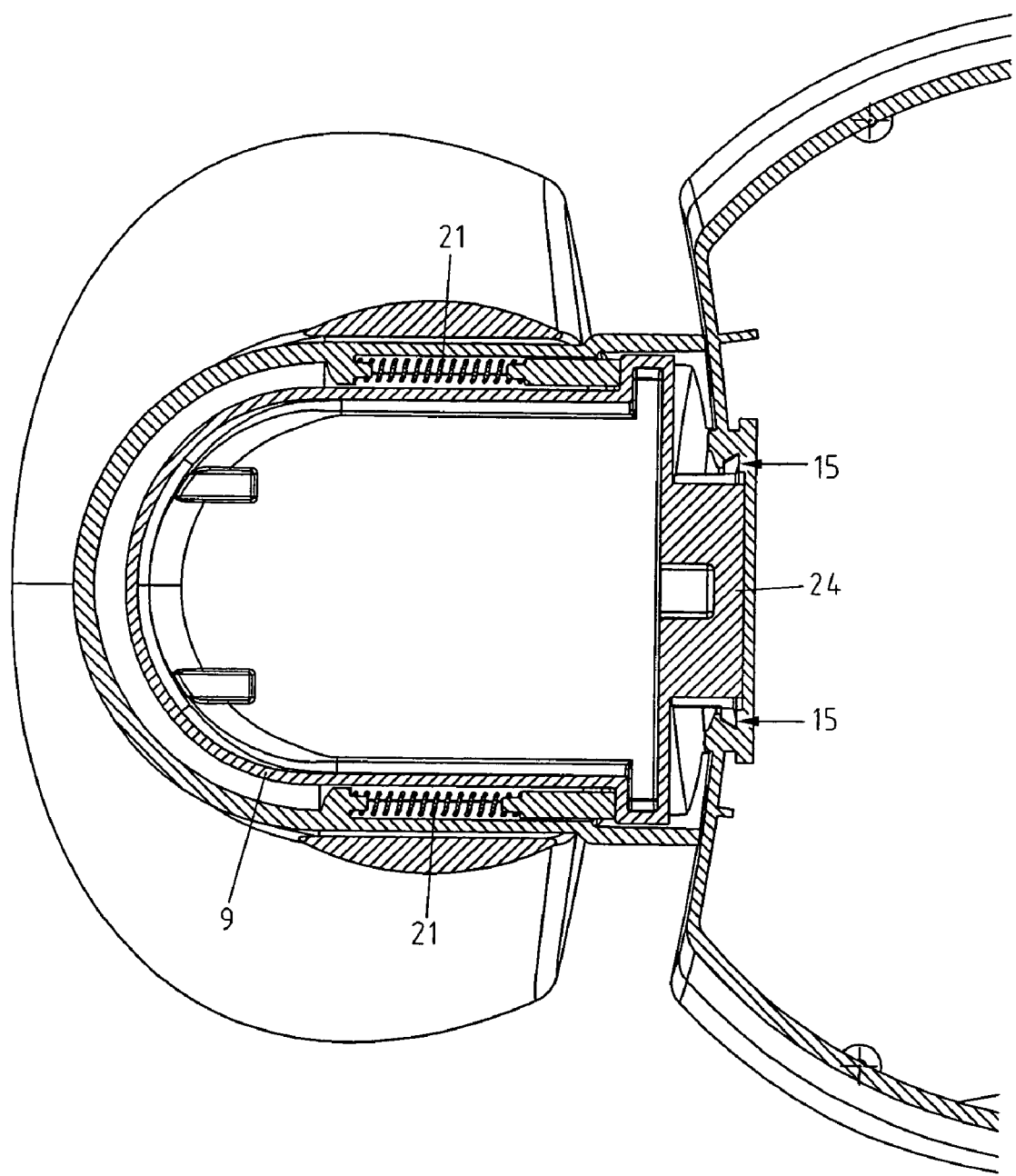
FIG. 5 shows a cross sectional view of the components shown in FIG. 4.

FIG. 5 shows a cross sectional view of the components and elements of FIG. 4. Particularly apparent in this view are the slider 9, biased by the two springs 21, the protrusion 24 as well as the two dovetail-shaped guide rails 15.

Figure 6:
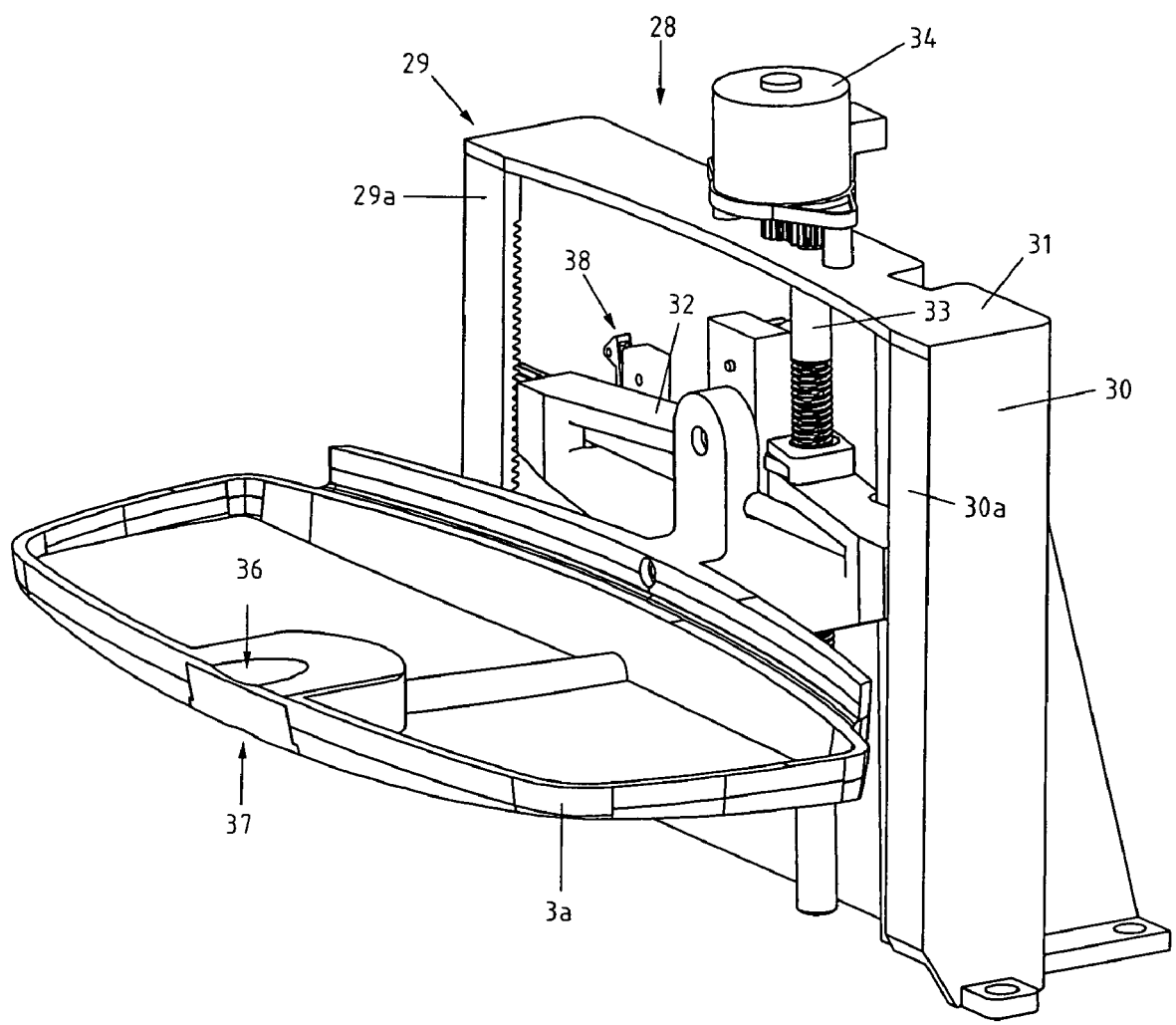
FIG. 6 shows a perspective front view of an alternative embodiment of a guide mechanism.

FIG. 6 shows an alternative embodiment of an adjustment assembly 27 in a perspective front view from an elevated point of view. The adjustment assembly 27 comprises a vertically extending supporting bracket 28, having a substantially rectangular cross section and an open front side directed towards the collecting tray 3a. Thus, two substantially L-shaped side walls 29, 30 are constituted. The top of the supporting bracket 28 is provided with an upper faceplate 31. The inner side of each base portion of the L-shaped side walls 29, 30 is provided with a gear rack, as will be further explained herein after. Again, for guiding and supporting the collecting tray 3a, a support member 32 is provided.

In addition, the adjustment assembly 27 comprises a threaded spindle 33 driven by an electro motor 34, serving for height adjustment of the support member 32 and, therewith, the collecting tray 3a. In the region of its frontal portion, the collecting tray 3a is provided with a first sensor 36, located at its top side, and a second sensor 37, located at its bottom side. These sensors operate in response to a touch with a finger and are operationally connected to the electronic control module (not shown) of the coffee maker. Thereby, the electro motor 34, operationally connected to the electronic control unit of the coffee maker as well, is operated such that it rotates the threaded spindle 33 in a first direction to move the collecting tray 3a downwards upon touching the upper sensor 36, and that it rotates the threaded spindle 33 in a second direction to move the collecting tray 3a upwards upon touching the lower sensor 37.

Furthermore, there is provided an upper limit switch 38, interrupting an upward motion of the collecting tray 3a as soon as a lever (not shown) attached to the support member 32 operates the limit switch 38. Similarly, a lower limit switch (not shown) is provided, limiting the downward motion of the collecting tray 3a. The threaded spindle 33 is provided with a self-locking thread, with the result that the support member 32 is locked regarding its vertical position once the threaded spindle 33 is at rest.

Figure 7:
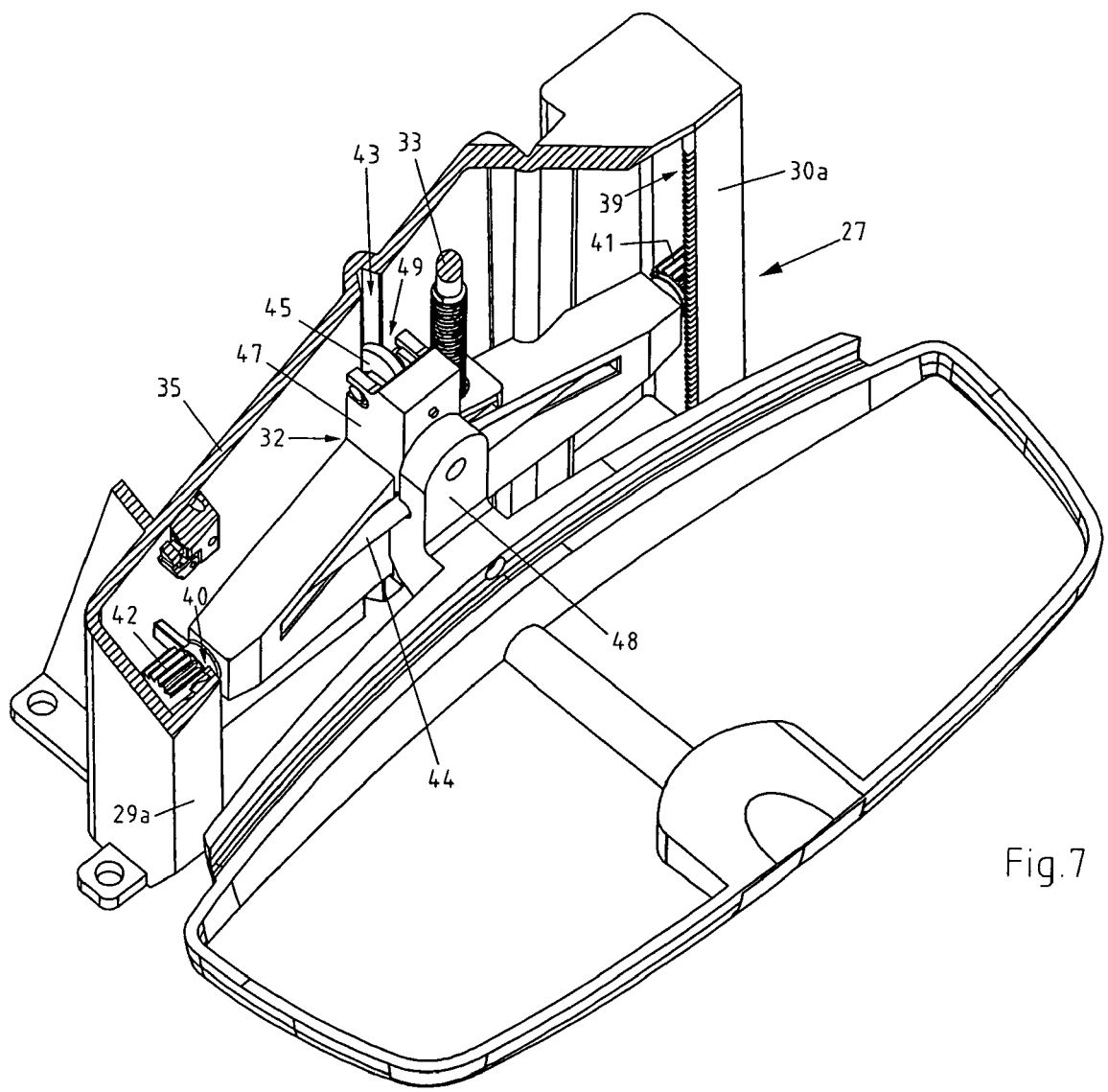
FIG. 7 shows a partial cross sectional view of the alternative embodiment of FIG. 6.

FIG. 7 shows the embodiment according to FIG. 6 in a perspective view, whereby a portion at the top is cut away for greater clarity. Thus, clearly apparent from this view, besides the components and elements mentioned herein before, are the two gear racks 39, 40, two pinions 41, 42, positively coupled to each other by means of a shaft 44, a guide groove 43 provided in the rear wall 35, as well as a guide member 49. The two gear racks 39, 40 are integral parts of the two side walls 29, 30; particularly, they are formed into the inside of two respective base portions 29a, 30a of the side walls 29, 30. Each of the two pinions 41, 42 non-positively engages one of the two gear racks 39, 40.

The guide member 49 constitutes a portion of the support member 32 and comprises a U-shaped bracket 47. Two guide rollers 45, guided in the groove 43, are rotatably received in this U-shaped bracket 47. However, in FIG. 7, only the upper one of the guide rollers 45 is visible. These two guide rollers 45 serve for laterally guiding the support member 32 during its up and down movement. Moreover, they ensure that the support member cannot move backwards towards the rear wall 35, with the result that the two pinions 41, 42 compellingly engage the gear racks 39, 40. The collecting tray 3a is attached to the support member 32 by means of a support arm 48.

By providing a guide groove 43 with the guide rollers 45, 46 engaging the groove 43, further by providing two gear racks 39, 40 with the two pinions 41, 42 positively engaging the gear racks 39, 40 and connected to each other by the shaft 44, it is ensured also in this embodiment that the support member 32 can be quickly and easily adjusted in height without the danger that it would cant and that the support member 32 is soundly supported by the coffee machine and not very sensitive to eccentric loading.

Figure 8:
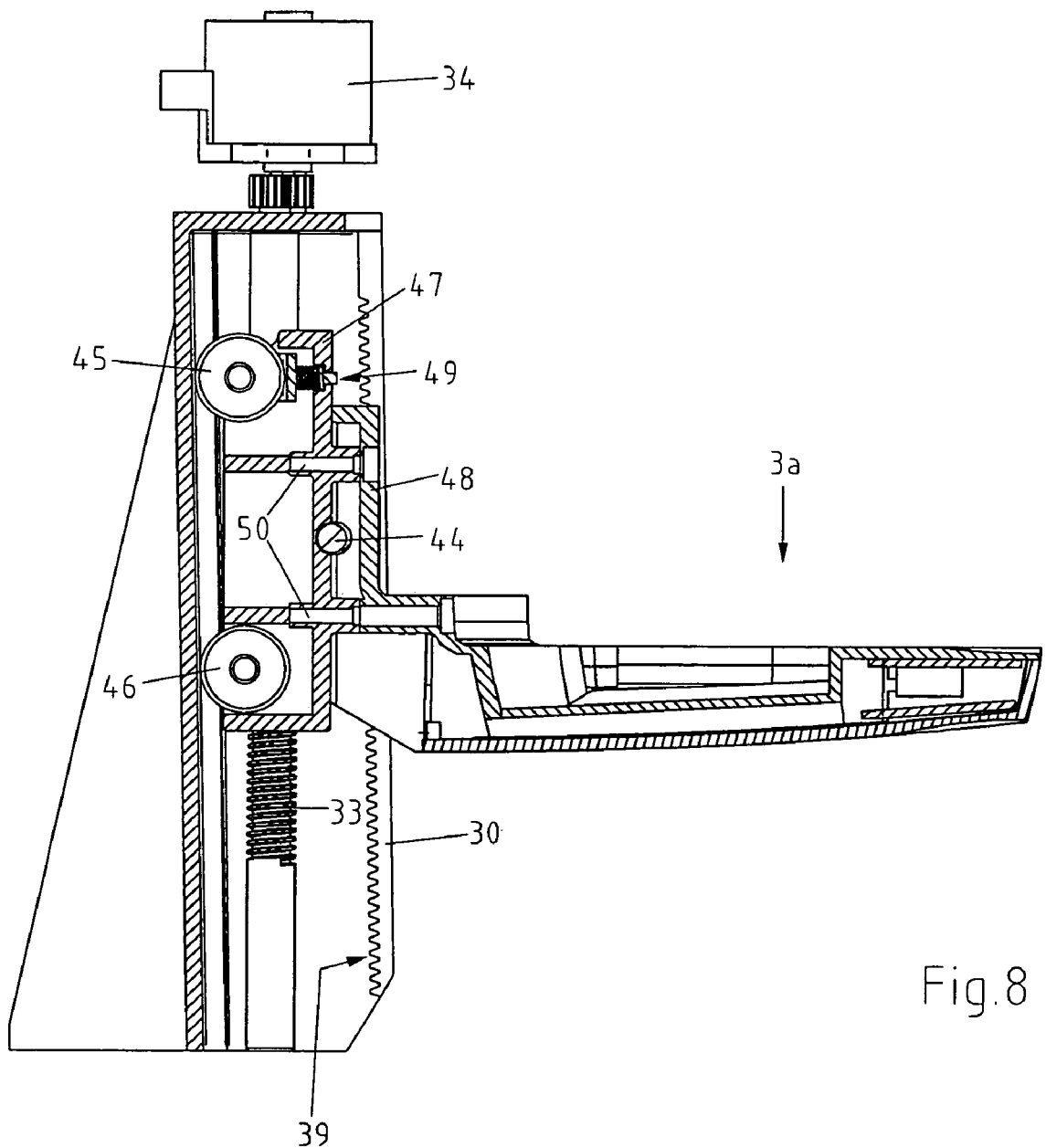
FIG. 8 shows a longitudinal sectional view of the alternative embodiment of FIG. 6.

FIG. 8 shows a longitudinal sectional view of the embodiment according to FIG. 6. Clearly apparent from this view, besides the components and elements mentioned herein before, are the collecting tray 3a, the threaded spindle 33, the electro motor 34, the one gear rack 39 being part of the side wall 30, the shaft 44 positively interconnecting the two pinions 41, 42, the guide member 49 with the bracket 47 and the two guide rollers 45, 46, as well as the support arm 48. Moreover, it is apparent that the upper guide roller 45 is supported on the bracket 47 by means of a pressure spring 50. By this resilient support of the upper guide roller 45, it is ensured that the collecting tray 3a is held in its position without backlash and that the two guide rollers 45, 46 are in permanent contact with the guide groove 43. Finally, two connecting bores 51 can be seen, serving to receive connecting means, e.g. screws, to attach the support arm 48 to the bracket 47.

The advantages of this height adjustment mechanism may be seen, amongst else, in the fact that the height position of the collecting tray 3a can be steplessly adjusted within a broad range. Thereby, the two pinions 41, 42 positively interconnected by means of the shaft 44 ensure that the collecting tray 3a is firmly supported by the supporting bracket 28 and that it does substantially not move or become bent under load. The stability of the entire assembly is further enhanced by the fact that the support member 32 is constituted by a boom, provided on both sides with a pinion 41, 42 engaging a gear rack 39, 40, whereby the guide rollers 45, 46 are centrally supported on the support member 32.

The embodiment discussed herein before with reference to FIGS. 6 to 8 is particularly suitable to be used with a fully automatic espresso coffee maker, whereby also the height adjustment of the collecting tray can be performed semi-automatically or fully automatically. For example, a sensor could be provided, recognizing the height of the coffee mug placed onto the collecting tray and moving the collecting tray automatically to a proper height position. In order to realize that, it would be required to move the collecting tray into its lowermost position after each coffee brewing operation. But also other variants are possible, for instance a displacement of the collecting tray in dependence of the selected coffee beverage to be brewed, i.e. espresso coffee, cappuccino coffee, regular coffee etc.

As an alternative to the embodiment shown in and discussed with reference to FIGS. 6 to 8, incorporating an electro motor and a threaded spindle, also a manual height position adjustment of the support member could be realized. Preferably, in such a case, the shaft 44 would be provided with an additional, central pinion, adapted to be locked by means of a suitable lock mechanism. Such a lock mechanism could be constituted, for example, by a spring-biased lever pivoting around a shaft, having a toothing at its end that engages the additional central pinion to prevent it from further rotation. For releasing, the lever would have to be pivoted, against the force of the spring, such that the support member, together with the collecting tray, can be moved to the desired height position. Upon the lever pivoting back under the influence of the spring, the additional central pinion is locked again, with the result that the support member, together with the collecting tray, is locked against movement in vertical direction.

What is claimed is:

1. Coffee maker, comprising:
   a housing;
   a beverage outlet;
   a collecting tray located below said beverage outlet; and
   a height adjustment assembly for adjusting the height position of said collecting tray, including a support member;
   said collecting tray being attached to said support member of said height adjusting assembly and provided with a cover plate member adapted to receive at least one coffee cup; and
   said height adjusting assembly including two gear rack members and a guide rail member located between said two gear rack members, said support member being provided with a guide member engaging said guide rail and a shaft member having at each of its two ends a pinion each engaging one of said two gear rack members.

2. Coffee maker according to claim 1 in which said height adjustment assembly comprises a vertically extending supporting bracket provided with said two gear rack members, whereby the two pinions are positively connected to each other by means of said shaft, and whereby means are provided for locking said shaft against rotation.

3. Coffee maker according to claim 2 in which means are provided for vertically moving said support member along said supporting bracket.

4. Coffee maker according to claim 3 in which said means for vertically moving said support member comprise a threaded spindle driven by an electric motor, operationally connected to said support member such that said support member is moved in vertical direction by rotating said threaded spindle.

5. Coffee maker according to claim 2 in which said supporting bracket is provided with a vertically extending guide rail adapted to be engaged by guide rollers provided on said support member.

6. Coffee maker according to claim 2 in which said supporting bracket has an essentially rectangular cross section and is open at the side facing said collecting tray, such that two essentially L-shaped side walls are present, each having a base portion, the inner side of the base portion of both side walls each being provided with a gear rack, whereby the inner side of the rear wall of said supporting bracket is provided with said guide rail, and whereby said support member is guided by said guide rollers engaging said guide rail such that said pinions compellingly engage said gear racks.

7. Coffee maker according to claim 5 in which said support member is provided with two guide rollers, at least one guide roller being supported by said support member by means of a pressure spring.

8. Coffee maker according to claim 2, further comprising an electronic control unit and at least one touch sensitive sensor located in the region of the front side of said collecting tray, said sensor being operationally connected to said electronic control unit such that, upon touching said sensor, said collecting tray is moved upwards or downwards by means of an electro motor drive means operationally connected to said electronic control unit.

9. Coffee maker according to claim 2, further comprising at least one touchless sensor for an automatic coffee cup recognition, operationally connected to said electronic control unit such that said collecting tray is moved upwards or downwards in response to the height of the coffee cup placed on top of said collecting tray.

10. Coffee maker according to claim 2 in which said support member has the shape of a boom, provided on both sides with a pinion engaging one of said gear racks, whereby said guide rollers are centrally arranged on said support member.

11. Coffee maker according to claim 2 in which said means for locking said shaft against rotation comprises a spring biased lever engaging at least one of the pinions.

12. Coffee maker according to claim 11 in which said lever is manually movable, against the force of said spring, to release said shaft for rotation.

13. Coffee maker according to claim 10 in which said shaft is provided with three pinions, a first and a second pinion being located at the two ends of said shaft and the third being located in-between, whereby said third pinion is adapted to be locked by means of said lever.

14. Coffee maker according to claim 3 in which said supporting bracket is provided with a vertically extending guide rail adapted to be engaged by guide rollers provided on said support member.

15. Coffee maker according to claim 4 in which said supporting bracket is provided with a vertically extending guide rail adapted to be engaged by guide rollers provided on said support member.

16. Coffee maker according to claim 3 in which said supporting bracket has an essentially rectangular cross section and is open at the side facing said collecting tray, such that two essentially L-shaped side walls are present, each having a base portion, the inner side of the base portion of both side walls each being provided with a gear rack, whereby the inner side of the rear wall of said supporting bracket is provided with said guide rail, and whereby said support member is guided by said guide rollers engaging said guide rail such that said pinions compellingly engage said gear racks.

17. Coffee maker according to claim 4 in which said supporting bracket has an essentially rectangular cross section and is open at the side facing said collecting tray, such that two essentially L-shaped side walls are present, each having a base portion, the inner side of the base portion of both side walls each being provided with a gear rack, whereby the inner side of the rear wall of said supporting bracket is provided with said guide rail, and whereby said support member is guided by said guide rollers engaging said guide rail such that said pinions compellingly engage said gear racks.

18. Coffee maker according to claim 5 in which said supporting bracket has an essentially rectangular cross section and is open at the side facing said collecting tray, such that two essentially L-shaped side walls are present, each having a base portion, the inner side of the base portion of both side walls each being provided with a gear rack, whereby the inner side of the rear wall of said supporting bracket is provided with said guide rail, and whereby said support member is guided by said guide rollers engaging said guide rail such that said pinions compellingly engage said gear racks.

19. Coffee maker according to claim 6 in which said support member is provided with two guide rollers, at least one guide roller being supported by said support member by means of a pressure spring.

20. Coffee maker according to claim 3, further comprising an electronic control unit and at least one touch sensitive sensor located in the region of the front side of said collecting tray, said sensor being operationally connected to said electronic control unit such that, upon touching said sensor, said collecting tray is moved upwards or downwards by means of an electro motor drive means operationally connected to said electronic control unit.

21. Coffee maker according to claim 4, further comprising an electronic control unit and at least one touch sensitive sensor located in the region of the front side of said collecting tray, said sensor being operationally connected to said electronic control unit such that, upon touching said sensor, said collecting tray is moved upwards or downwards by means of an electro motor drive means operationally connected to said electronic control unit.

22. Coffee maker according to claim 5, further comprising an electronic control unit and at least one touch sensitive sensor located in the region of the front side of said collecting tray, said sensor being operationally connected to said electronic control unit such that, upon touching said sensor, said collecting tray is moved upwards or downwards by means of an electro motor drive means operationally connected to said electronic control unit.

23. Coffee maker according to claim 6, further comprising an electronic control unit and at least one touch sensitive sensor located in the region of the front side of said collecting tray, said sensor being operationally connected to said electronic control unit such that, upon touching said sensor, said collecting tray is moved upwards or downwards by means of an electro motor drive means operationally connected to said electronic control unit.

24. Coffee maker according to claim 7, further comprising an electronic control unit and at least one touch sensitive sensor located in the region of the front side of said collecting tray, said sensor being operationally connected to said electronic control unit such that, upon touching said sensor, said collecting tray is moved upwards or downwards by means of an electro motor drive means operationally connected to said electronic control unit.

25. Coffee maker according to claim 3, further comprising at least one touchless sensor for an automatic coffee cup recognition, operationally connected to said electronic control unit such that said collecting tray is moved upwards or downwards in response to the height of the coffee cup placed on top of said collecting tray.

26. Coffee maker according to claim 4, further comprising at least one touchless sensor for an automatic coffee cup recognition, operationally connected to said electronic control unit such that said collecting tray is moved upwards or downwards in response to the height of the coffee cup placed on top of said collecting tray.

27. Coffee maker according to claim 5, further comprising at least one touchless sensor for an automatic coffee cup recognition, operationally connected to said electronic control unit such that said collecting tray is moved upwards or downwards in response to the height of the coffee cup placed on top of said collecting tray.

28. Coffee maker according to claims 6, further comprising at least one touchless sensor for an automatic coffee cup recognition, operationally connected to said electronic control unit such that said collecting tray is moved upwards or downwards in response to the height of the coffee cup placed on top of said collecting tray.

29. Coffee maker according to claim 7, further comprising at least one touchless sensor for an automatic coffee cup recognition, operationally connected to said electronic control unit such that said collecting tray is moved upwards or downwards in response to the height of the coffee cup placed on top of said collecting tray.

30. Coffee maker according to claim 8, further comprising at least one touchless sensor for an automatic coffee cup recognition, operationally connected to said electronic control unit such that said collecting tray is moved upwards or downwards in response to the height of the coffee cup placed on top of said collecting tray.

31. Coffee maker according to claim 3 in which said support member has the shape of a boom, provided on both sides with a pinion engaging one of said gear racks, whereby said guide rollers are centrally arranged on said support member.

32. Coffee maker according to claim 4 in which said support member has the shape of a boom, provided on both sides with a pinion engaging one of said gear racks, whereby said guide rollers are centrally arranged on said support member.

33. Coffee maker according to claim 5 in which said support member has the shape of a boom, provided on both sides with a pinion engaging one of said gear racks, whereby said guide rollers are centrally arranged on said support member.

34. Coffee maker according to claim 6 in which said support member has the shape of a boom, provided on both sides with a pinion engaging one of said gear racks, whereby said guide rollers are centrally arranged on said support member.

35. Coffee maker according to claim 7 in which said support member has the shape of a boom, provided on both sides with a pinion engaging one of said gear racks, whereby said guide rollers are centrally arranged on said support member.

36. Coffee maker according to claim 8 in which said support member has the shape of a boom, provided on both sides with a pinion engaging one of said gear racks, whereby said guide rollers are centrally arranged on said support member.

37. Coffee maker according to claim 9 in which said support member has the shape of a boom, provided on both sides with a pinion engaging one of said gear racks, whereby said guide rollers are centrally arranged on said support member.

38. Coffee maker according to claim 11 in which said shaft is provided with three pinions, a first and a second pinion being located at the two ends of said shaft and the third being located in-between, whereby said third pinion is adapted to be locked by means of said lever.

39. Coffee maker, comprising:
 a housing;
 a beverage outlet;
 a collecting tray located below said beverage outlet; and
 a height adjustment assembly for adjusting the height position of said collecting tray, said assembly including a support member;
 said collecting tray being attached to said support member of said height adjusting assembly and provided with a cover plate member adapted to receive at least one coffee cup; and
 said height adjusting assembly including a vertically extending gear rack member and two guide rail members running along both sides of said gear rack member and adapted to guide said support member, and said support member of said height adjustment assembly including a slider adapted to engage said gear rack member, said slider biased by means of a spring towards said gear rack and manually movable against the force of said spring to releasably lock said support member vertically along said gear rack.

40. Coffee maker according to claim 39 in which said gear rack member is located centrally on the housing and centrally between said two guide rail members.

41. Coffee maker according to claim 40 in which said guide rail members are provided with dovetail-shaped recesses, whereby said height adjustment assembly comprises a carriage member movable along said guide rails and provided with guide cam members located at both sides thereof, said guide cam members having a size and shape corresponding to the size and shape of said dovetail-shaped recesses and engaging said recesses, and whereby said support member is attached to said carriage member.

42. Coffee maker according to claim 39 in which said support member is essentially L-shaped and comprises a vertically extending leg, the top side of said leg being provided with a snap-on element, said collecting tray being provided with a corresponding snap-on element adapted to engage said snap-on element of said leg of said support member to be releasably attached thereto.

43. Coffee maker, comprising:
 a housing;
 a beverage outlet;
 a collecting tray located below said beverage outlet; and
 a height adjustment assembly for adjusting the height position of said collecting tray, said assembly including a support member;
 said collecting tray being attached to said support member of said height adjusting assembly and provided with a cover plate member adapted to receive at least one coffee cup;
 wherein said height adjusting assembly including a vertically extending gear rack member and two guide rail members running along both sides of said gear rack member and adapted to guide said support member, said gear rack member being located centrally on the housing and centrally between said two guide rail members;
 wherein said support member of said height adjustment assembly including at least one element adapted to engage said gear rack member and to releasably lock said support member vertically along said gear rack; and
 further wherein said guide rail members are provided with dovetail-shaped recesses, whereby said height adjustment assembly includes a carriage member movable along said guide rails and provided with guide cam members located at both sides thereof said guide cam members having a size and shape corresponding to the size and shape of said dovetail-shaped recesses and engaging said recesses, and whereby said support member is attached to said carriage member.

* * * * *